United States Patent Office 3,465,016
Patented Sept. 2, 1969

3,465,016
PRODUCTION OF MACROCYCLIC
POLYSILOXANES
James F Hampton, Midland, Mich., assignor to Dow
Corning Corporation, Midland, Mich., a corporation of
Michigan
No Drawing. Filed Apr. 19, 1967, Ser. No. 631,911
Int. Cl. C08g 31/09; C07f 7/02
U.S. Cl. 260—448.2                                    6 Claims

ABSTRACT OF THE DISCLOSURE

Cyclicsiloxanes having more than 3 silicon atoms are prepared in high yield by polymerizing cyclotrisiloxanes in halosilane solvent in the presence of a hydrogen halide. For example, a mixture of hexamethylcyclotrisiloxane in the presence of dimethyldichlorosilane and a trace of hydrogen chloride at the room temperature produces a mixture of dimethylsiloxane cyclics having from 6 to 54 and above silicon atoms per molecule. Most of the cyclics in the mixture contain multiples of three silicon atoms, i.e., 6, 9, 12, 18, 39, etc. The compounds are useful as lubricants and hydraulic fluids.

---

It has been known for sometime that macrocyclicsiloxanes (i.e. cyclics containing more than 8 silicon atoms) are produced in minute quantities during the commercial preparation of diorganosiloxane polymers. In addition, these macrocyclic materials, particularly those having 12 or more silicon atoms per molecule can be isolated from the mixture only through laborious separation techniques. Consequently, these materials have not been commercially available. Cyclicsiloxanes are inherently more thermally stable than linear siloxane of equivalent molecular weight. Thus, for example, cyclicdimethylsiloxanes are more thermally stable than the corresponding trimethylsiloxy endblocked dimethylsiloxanes, or the corresponding hydroxyl endblocked dimethylsiloxanes. Thus, it would be beneficial to the art to have available in commercial quantities higher cyclic siloxanes in the viscosity range from say 5 to 100 cs. It is the object of this invention to make such materials available in a feasible manner. These cyclics are useful as lubricants, hydraulic fluids, and for other uses for which siloxane fluids are normally employed.

This invention relates to a method of preparing cyclicsiloxanes by mixing (A) a cyclotrisiloxane of the unit formula $R_2SiO$ in which at least one R group on at least 2 silicon atoms in said trisiloxane is a methyl radical and the remaining R groups in (A) being (1) monovalent hydrocarbon radicals or (2) substituents of the group consisting of halogenated monovalent hydrocarbon radicals, hydrogen atoms, halogen atoms, and alkoxy groups, there being no more than two (2) substituent per molecule of (A), both of which are on the same silicon atom with (B) a compound of the group silanes of the formula $$R'_nSiX_{4-n}$$

in which R' is a monovalent hydrocarbon radical, a halogenated monovalent hydrocarbon radical or a hydrogen atom, there being at least one hydrocarbon or halohydrocarbon radical per Si, X is halogen and at least 1 X per molecule being chlorine, bromine or iodine, and n is an integer from 1 to 3, silcarbanes of the formula $$(X_mR'_{3-m}Si)_aY$$

in which X is as above defined, R' is a monovalent hydrocarbon radical, a monovalent halohydrocarbon radical or a hydrogen atom, $m$ is an integer from 1 to 3, Y is a polyvalent hydrocarbon radical and $a=$the valence of Y; and siloxanes of the formula

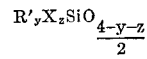

in which R' and X are as above defined, except that there being at least one monovalent hydrocarbon or halohydrocarbon radical per molecule, y has an average value from 0.5 to 2.5, z has an average value from .1 to 3, and the sum of y+z equals no more than 3; and (C) at least a trace of HX' in which X' is chlorine, bromine or iodine, there being at least 5% by weight of (B) based on the weight of (A), whereby cyclicsiloxanes of the formula $(R_2SiO)_x$ are formed in which $x$ is an integer greater than 3, and R is as above defined.

In the process of this invention the cyclotrisiloxanes are polymerized to the macrocyclic compounds under conditions in which solvent (B) does not enter into the reaction. This is accomplished by carrying out the polymerization in the absence of catalysts which promote the reaction of siloxanes with halosilanes. Also the reaction is best carried out under conditions of time and temperature which give nonequilibrium conditions. If the polymerization is allowed to proceed for too long a time, or if it is carried out at too high a temperature, one will obtain a equilibrium mixture in which the yield of cyclics approach that obtained in the heretofore employed polymerization procedures. This is accompanied by an increase in the amount of linear siloxanes.

Another aspect of this invention is that the procedure produces a preponderance of cyclics of the formula $$(R_2SiO)_{3x}$$

i.e. of cyclics in which the number of silicon atoms are multiples of 3. However, there is also produced some cyclics in which the number of silicon atoms per cyclic are not a multiple of three.

In carrying out the polymerization of this invention the time-temperature relationship is not particularly critical provided one maintains non-equilibrating conditions. Thus, the reaction can be carried out from below room temperature to a temperature of 150° C. or above. In general, at the higher temperatures the degree of polymerization of the resulting cyclic material will be lower than if the polymerization is carried out at room temperature or below. Thus, for example, a polymerization carried out at 150° C. may give predominately a cyclohexasiloxane, whereas the same polymerization carried out at room temperature may give increased yields of cyclic material having 18 or more silicon atoms. Also the degree of polymerization of the resulting material is affected by the particular cyclicsiloxanes employed as starting materials and the particular solvents (B) employed.

In addition to critical solvents (B) one may employ nonpolar solvents such as toluene, benzene, xylene or hexane, and the like. These secondary solvents can be helpful when (A) and (B) are both solid or are not completely compatible with each other.

For the purpose of this invention (A) can be hexamethylcyclotrisiloxane or any cyclotrisiloxane of the formula $[R''(CH_3)SiO]_3$ in which R'' is any monovalent hydrocarbon radical. In addition, (A) can be any cyclotrisiloxane of the formulae $[R'''R''SiO(R''CH_3SiO)_2]$ and $[R'''_2SiO(R''CH_3SiO)_2]$, in which R''' can be any monovalent hydrocarbon radical or any halogenated monovalent hydrocarbon radical, any halogen atom, a hydrogen atom, any alkoxy group. This means then that the starting tricyclosiloxanes of this invention can contain up to two halogenated hydrocarbon radicals, two hydrogen atoms, two halogen atoms or two alkoxy groups. To put it another way, the starting tricyclosiloxane must contain at least two methyl radicals, and preferably should contain a methyl radical on each silicon.

Then cyclosiloxanes containing functional groups such as halogen or alkoxy or hydrogen can be used to produce macrocyclicsiloxanes having functional groups in the molecule. This type of product, of course, is useful for the preparation of cured crosslinked siloxanes.

Specific examples of cyclotrisiloxanes which can be employed herein are symmetrical materials such as hexamethylcyclotrisiloxane;
1,3,5-trimethyl-1,3,5-triphenylcyclotrisiloxane;
1,3,5-trimethyl-1,3,5-trivinylcyclotrisiloxane;
1,3,5-trimethyl-1,3,5-trioctadecylcyclotrisiloxane;
1,3,5-trimethyl-1,3,5-tricyclohexylcyclotrisiloxane;
1,3,5-trimethyl-1,3,5-tritolylcyclotrisiloxane; and
1,3,5-trimethyl-1,3,5-tri($\beta$-phenylpropyl)cyclotrisiloxane.

The starting siloxanes can also be unsymmetrical materials such as 1,1-diphenyl-3,3,5,5-tetramethylcyclotrisiloxane;
1-trifluoropropyl-1,3,3,5,5-pentamethylcyclotrisiloxane;
1-ethoxy-3,5-diphenyl-1,3,5-trimethylcyclotrisiloxane;
1-octadecyloxy-1,3,3,5,5-pentamethylcyclotrisiloxane;
1-fluoro-1,3,3,5,5-pentamethylcyclotrisiloxane;
pentamethylcyclotrisiloxane;
1,1-divinyl-3,3,5,5-tetramethylcyclotrisiloxane;
1,1-dioctadecyl-3,3,5,5-tetramethylcyclotrisiloxane;
1-($C_8F_{17}CH_2CH_2$)-1,3,3,5,5-pentamethylcyclotrisiloxane;
1,1-di($\beta$-phenylpropyl)-3,3,5,5-tetramethylcyclotrisiloxane;
1-xenyl-1,3,3,5,5-pentamethylcyclotrisiloxane;
1,1-(bis-trifluoropropyl)-3,3,5,5-tetramethylcyclotrisiloxanes; and
1,1-dimethoxy-3,3,5,5-tetramethylcyclotrisiloxane.

At least 5% by weight (B) based on the weight of (A) should be employed in the process of this invention. The maximum amount of (B) used is not critical except that obviously excessive amounts of (B) will reduce the volume efficiency of the reaction. As can be seen, the solvent (B) can be a simple halosilane or it can be a halosilcarbane or a halosiloxane. Specific examples of operative silanes are:

dimethyldibromosilane;
phenylmethyldichlorosilane;
vinyltrichlorosilane;
vinyldimethylmonochlorosilane;
methyldifluoromonochlorosilane;
octadecyltrichlorosilane;
phenyltrichlorosilane;
xenyltrichlorosilane;
tolylmethyldichlorosilane;
trifluoropropylmethyldichlorosilane;
chlorophenyltrichlorosilane;
gamma-chloropropyltrichlorosilane;
bromophenylmethyldichlorosilane;
allyltrichlorosilane;
cyclohexylmethyldichlorosilane;
cyclohexenyldichlorosilane;
methyldichlorosilane and
trimethyliodosilane.

(B) can also be any silcarbane having two or more silicon atoms attached to a hydrocarbon nucleus such as, for example, bis(trichlorosilyl)benzene;
bis(trichlorosilyl)methane;
bis(methyldibromosilyl)benzene;
tris(methyldichlorosilyl)benzene;
bis(methylfluorochlorosilyl)ethane;
1,4-bis(trichlorosilyl)butane;
bis(phenyldichlorosilyl)cyclohexane;
bis(vinyldichlorosilyl)benzene;
tetrakis(methyldichlorosilyl)benzene;
P,P'(methyldichlorosilyl)biphenyl and
(methylmonochlorosilyl)(trichlorosilyl)benzene.

(B) can also be a halosiloxane such as 1,3,dimethyl-1,3,3,3-tetrachlorodisiloxane;
1,7-dibromo-1,1,3,3,5,5,7,7-octamethyltetrasiloxane;
bromopentamethyldisiloxane; and
1,3-dibromo-1,3-diphenyl-1,3-dimethyldisiloxane.

In any of these cases in which (B) is a solid the reaction is best carried out at a temperature above the melting point of (B) or in the presence of a nonpolar mutual solvent for (A) and (B).

For the purpose of this invention there needs to be a trace of hydrogen chloride, hydrogen bromide or hydrogen iodide present in the reaction mixture. The hydrogen halide can be added as such or it can be generated in situ by exposing the reaction mixture to atmospheric moisture, or by having traces of moisture otherwise present in the reaction vessel. Obviously excessive amounts of water should be avoided or otherwise the predominant reaction will be the hydrolysis of the halosilane solvent.

The time of polymerization is not critical except that excessive lengths of time may lead to an equilibration of the product with resulting reduction in yield of the desired macrocyclics.

The separation of the desired cyclic products from the polymerization mixture varies depending upon the molecular weight of the cyclics and upon the type of (B) employed.

Usually the first step after completion of the polymerization is the removal of (B) by distillation. This is particularly true where (B) is much more volatile than the cyclic products. The residue after the removal of (B) can then be stripped to remove those cyclics which are volatile under ordinary distillation conditions. Often it is desirable to wash the residue free of halogen prior to distillation. During the work up of the macrocyclics it is desirable not to have them stand in contact to the hydrogen halide for too long a period of time since this may cause equilibration of the product and reduce the yield of the macrocyclics.

For those cyclic materials which are less volatile the best means of recovery involves the fractionation of the residue by means of a silicone rubber membrane. In order to accomplish a feasible separation it is usually necessary to first polymerize the noncyclic material [derived from washing residual (B)] to a high polymer under conditions which do not rearrange the macrocyclic product. This can be accomplished, for example, by adding calcium oxide or some other SiOH condensation catalyst to the residue and heating to cause condensation of the hydroxyl endblocked material [derived from (B)]. During this process the macrocyclics remain unchanged. The product is then placed in a contained of silicone rubber and the macrocyclics are allowed to diffuse through the rubber membrane. Since they are of lower molecular weight than the condensation polymer, they will pass through the membrane first and can be separated from the high polymer. The method of separating siloxanes by this extraction process is more particularly set forth in the copending application of Donald E. McVannel, Ser. No. 539,746, filed Apr. 4, 1966, which is incorporated herein by reference.

In general, cyclic materials having up to 42 silicon atoms can be isolated by vacuum distillation. Cyclic materials having higher molecular weights are best isolated on a molecular still or by the aforesaid extraction process.

The following examples are illustrative only and should not be construed as limiting the invention which is properly delineated in the appended claims. In the examples the following abbreviations are used: Me for methyl, Et for ethyl and Ph for phenyl.

Example 1

1680 g. of hexamethylcyclotrisiloxane was mixed with 1520 g. of dimethyldichlorosilane in a distillation flask and allowed to stand at room temperature for about four hours. No attempt was made to protect the mixture from atmospheric moisture. After four hours all of the cyclotrisiloxane had disappeared and a distribution of cyclics of the formula $(Me_2SiO)_{3x}$ was observed by gas liquid chromatography.

The pressure was then reduced and the dimethyldichlorosilane solvent was removed by warming to 60° C. at 1 mm. of Hg.

During the removal of the chlorosilane there was no appreciable change in the distribution of cyclics in the flask as observed by the GLC analysis.

The residue was then vacuum stripped with a nitrogen purge at a temperature up to 350° C. at .3 mm. of mercury. 993 g. of a mixture of cyclics was obtained. The distillate was analyzed using a F and M Scientific Company Model 500 Gas Liquid Chromatography instrument having a 720 attachment (i.e. a dual column instrument). The area percentage of the curve occupied by the peaks formed by various cyclics was determined by the disc integrator on the instrument. The percentage of the total curve attributable to each cyclic dimethylsiloxane is shown in the table below:

| No. of Si atoms in cyclic: | Area percent |
|---|---|
| 4 | .08 |
| 5 | .13 |
| 6 | 35.50 |
| 9 | 29.70 |
| 12 | 14.80 |
| 15 | 8.88 |
| 18 | 5.14 |
| 21 | 1.84 |

Thus it can be seen that at least 95.86% of the distillate was composed of dimethylcyclicsiloxanes containing multiples of three silicon atoms.

The residue from the second distillation contained higher cyclosiloxanes.

Example 2

Step 1.—4440 g. of hexamethylcyclotrisiloxane was dissolved in 7740 g. of dimethyldichlorosilane and allowed to stand 5½ hours at room temperature. The chlorosilane solvent was then removed by heating up to 50° C. at 1 mm. mercury. 96% of the original amount of chlorosilane was recovered.

Part of the 2194 g. of residue from step 1 was then distilled by heating to a pot temperature of 338° C. at .3 mm. mercury. There was obtained 1050 g. of a material which was shown by analysis to contain the following cyclicdimethylsiloxanes in the following percent by weight based on the total weight of the distillate.

| No. of Si atoms in cyclics: | Percent by wt. of the distillate |
|---|---|
| 5 | 2.16 |
| 6 | 30.79 |
| 7 | 1.26 |
| 9 | 26.40 |
| 11 | .34 |
| 12 | 13.82 |
| 13 | .31 |
| 15 | 9.06 |
| 18 | 6.77 |
| 21 | 1.70 |
| 27 | .88 |
| 30 | .47 |

Step 2.—The other portion of the residue from step 1 was washed with water to remove residual chloride. After washing the distribution of cyclics was shown by GLC to be the same as before the washing step. 5% by weight calcium oxide was then added and the mixture was heated in a closed system for 3½ hours at 150° C. to polymerize the SiOH ended material in the mixture. At the end of the polymerization step gas liquid chromatograph analysis showed the same cyclic pattern as before polymerization.

The product was dissolved in hexane and filtered to remove calcium oxide. A portion of the solution was extracted through a silicone rubber membrane to separate the large cyclics from the high polymer. 53.2% of the total material put into the extractor was recovered in the form of a mixture of large cyclic siloxanes. This mixture was a fluid having a viscosity of 18 cs. at 25° C. and a refractive index at 25° C. of 1.4042. Analysis by gas liquid chromatography and gel permeation chromatography showed that the extract was composed of 95% by weight of cyclicdimethylsiloxanes of the formula $(Me_2SiO)_{3x}$ in which $x$ has a value of 2, 3, 4, 5, 6, 7, 8, 9, 10, 11, 12, 13, and 14.

Another portion of the hexane solution of step 2 was extracted as shown above and samples of the material coming through the silicone rubber membrane were taken periodically. The fraction which came through between 72 and 96 hours was shown by gas liquid chromatography to contain a dimethylcyclicsiloxane having 51 silicon atoms, i.e. $x=17$.

Example 3

47 g. of hexamethylcyclotrisiloxane was mixed at room temperature with 70 g. of 3,3,3-trifluoropropylmethyldichlorosilane and allowed to stand for 30 minutes. Gas liquid chromatography analysis of the product showed the following distribution of dimethylcyclicsiloxanes expressed in area percent of the chromatography curve.

| No. of Si atoms in cyclics: | Area percent |
|---|---|
| 3 | 28.5 |
| 4 | None |
| 5 | None |
| 6 | 21.8 |
| 9 | 22.8 |
| 12 | 9.84 |
| 15 | 5.84 |
| 18 | 5.26 |
| 21 | 2.85 |
| 24 | 1.78 |
| 27 | 1.07 |

The high percent of hexamethyltrisiloxane indicates that the reaction had not gone to completion.

Example 4

57.3 g. of phenylmethyldichlorosilane was mixed with 22.2 g. of hexamethylcyclotrisiloxane and allowed to stand in a loosely capped container for 20 hours at room temperature. Analysis of the product by gas liquid chromatography showed the following cyclics in weight percent based on the total weight of the siloxane.

| No. of Si atoms in cyclics: | Area percent |
|---|---|
| 3 | None |
| 6 | 37.3 |
| 9 | 23.5 |
| 12 | 13.2 |
| 15 | 8.77 |
| 18 | 5.71 |
| 21 | 4.76 |
| 24 | 3.84 |
| 27 | 2.92 |
| 30 | Trace |

No other cyclicsiloxane material was observed.

Example 5

Three mols of 1,3,5-triethyl-1,3,5-trimethylcyclotrisiloxane was mixed with 9 mols of ethylmethyldichlorosilane and the mixture was stirred at room temperature for 195 minutes. At the end of this time the cyclotrisiloxane had disappeared and a gas liquid chromatograph showed the presence of cyclics of the formula $(EtMeSiO)_{3x}$. The chlorosilane was then removed by distillation and 98.8% recovered. The residue amounted to 1035 g. and this was further distilled by heating to a temperature of 350° C. at .15 mm. of mercury. 368.4 g. of distillate was obtained which was composed of ethylmethylcyclosiloxanes having 6, 9, 12, 15, 18 and 21 silicon atoms. The residue from the distillation containing ethylmethylcyclosiloxanes having higher numbers of silicon atoms.

Example 6

A mixture of 25 g. each of methyltrichlorosilane and hexamethylcyclotrisiloxane was allowed to stand at room temperature for 20 days. The product obtained was shown by gas liquid chromatography to contain dimethylcyclosiloxanes having 6, 9, 12, 15, and 18 silicon atoms.

Example 7

2.2 parts by weight of hexamethylcyclotrisiloxane was mixed with 15 parts by weight of

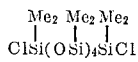

and the mixture was allowed to stand at room temperature for 6½ hours. At the end of this time GLC analysis showed the presence of dimethylcyclosiloxanes having 6, 9, 12, and 15 silicon atoms.

Example 8

2 parts by weight of hexamethylcyclotrisiloxane and 4.6 parts by weight of trimethylbromosilane were mixed and allowed to stand for 4 hours at room temperature. Analysis of the product by gas liquid chromatography showed that the following dimethylcyclosiloxanes were obtained. The percentages shown represent the area percent based on the area of the curve for the total siloxane elected.

| No. of Si atoms in cyclics: | Area percent |
|---|---|
| 6 | 21.8 |
| 9 | 12.4 |
| 12 | 8.09 |
| 15 | 5.33 |
| 18 | 4.62 |
| 21 | 3.56 |
| 24 | 2.84 |

Example 9

2.64 parts by weight of 1,3,5-triethyl-1,3,5-trimethylcyclotrisiloxane, 2.22 parts by weight hexamethylcyclotrisiloxane and 8.48 parts by weight of ethylmethyldichlorosilane were mixed and allowed to stand at room temperature. Gas liquid chromatography analysis of the product showed a mixture of cyclics of the formula $(EtMeSiO)_{3x}$, cyclics of the formula $(Me_2SiO)_{3x}$, as well as mixed siloxanes containing both ethylmethylsiloxane units and dimethylsiloxane units. The silicon atoms in these mixed cyclics were in multiples of 3.

Example 10

2.58 parts by weight of 1,3,5-trivinyl-1,3,5-trimethylcyclotrisiloxane, and 4.23 parts by weight of vinylmethyldichlorosilane were mixed and allowed to stand at room temperature for 25 hours. Analysis of the product by gas liquid chromatography showed vinylmethylcyclosiloxanes containing 6, 9 and 12 silicon atoms.

Example 11

3.66 parts by weight of 1,3,5-triphenyl-1,3,5-trimethylcyclotrisiloxane, and 5.73 parts by weight of phenylmethyldichlorosilane were mixed and allowed to stand for 3.5 hours at room temperature and an analysis of the product by gas liquid chromatography showed phenylmethylcyclosiloxanes having 6 and 9 silicon atoms.

Example 12

44.4 g. of hexamethylcyclotrisiloxane was mixed with 3.82 g. of phenylmethyldichlorosilane and the mixture heated at 125° C. for 139 hours. At the end of this time no hexamethylcyclotrisiloxane was observed and there was a preponderance of product in the form of dodecamethylcyclohexasiloxane.

Example 13

22.2 g. of hexamethylcyclotrisiloxane was mixed with 34.5 g. of methyldichlorosilane in a soft glass container and allowed to stand at room temperature. After 6 hours the cyclotrisiloxane had been consumed. The chlorosilane was distilled and the residue was washed free of chloride. The residue was examined by GLC and was found to contain dimethylcyclosiloxanes containing 6, 9, 12, 15, 18, 21, 24, 27, 30, 33 and 36 silicon atoms.

Example 14

Equivalent results are obtained when the following cyclics are substituted in the procedure of Example 2.

1,3,5-octadecyl-1,3,5-trimethylcyclotrisiloxane,
1,1-diphenyl-3,3,5,5-tetramethylcyclotrisiloxane,
1(3,3,3-trifluoropropyl)-1,3,3,5,5-pentamethylcyclotrisiloxane,
1-methoxy-1-phenyl-3,3,5,5-tetramethylcyclotrisiloxane,
1-fluoro-1,3,3,5,5-pentamethylcyclotrisiloxane,
1-octadecyloxy-1,3,3,5,5-pentamethylcyclotrisiloxane,
1-bromo-1,3,3,5,5-pentamethylcyclotrisiloxane,
pentamethylcyclotrisiloxane, and
1,1-diethoxy-3,3,5,5-tetramethylcyclotrisiloxane.

Example 15

The following compounds can be used as (B) in the polymerization of hexamethylcyclotrisiloxane (A) to higher cyclics.

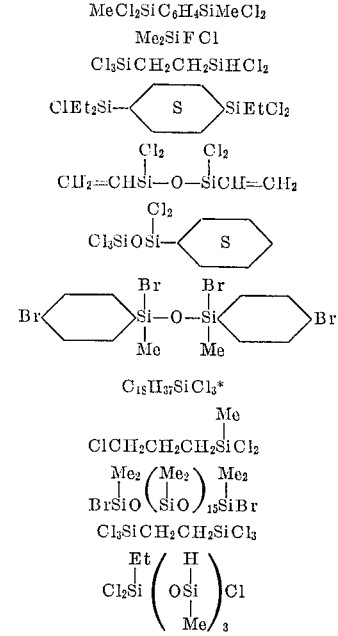

\* Carried out in 50% hexane solution based on total weight of (A) and (B).

That which is claimed is:
1. The process comprising mixing
    (A) a cyclotrisiloxane of the unit formula $R_2SiO$ in which at least one R group on at least 2 silicon atoms in said trisiloxane is a methyl radical and the remaining R groups in (A) being selected from the group consisting of (1) monovalent hydrocarbon radicals and
(2) substituents of the group consisting of halogenated monovalent hydrocarbon radicals, hydrogen atoms, halogen atoms, and alkoxy groups, there being no more than two (2) substituents per molecule of (A), both of which are on the same silicon atom, with (B) a compound selected from the group consisting of silanes of the formula $R'_n SiX_{4-n}$ in which $R'$ is a monovalent hydrocarbon radical, a halogenated monovalent hydrocarbon radical or a hydrogen atom, there being at least one of said hydrocarbon or halohydrocarbon radicals per Si, X is halogen and at least one X per molecule being chlorine, bromine or iodine, and $n$ is an integer from 1 to 3; silcarbanes of the formula $(X_m R''_{3-m} Si)_a Y$ in which X is as above defined, $R''$ is a monovalent hydrocarbon radical, a halogenated monovalent hydrocarbon radical or a hydrogen atom, $m$ is an integer from 1 to 3, Y is a polyvalent hydrocarbon radical and $a$ = the valence of Y; and siloxanes of the formula

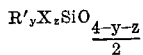

in which $R'$ and X are as above defined except that there being at least one hydrocarbon or halohydrocarbon radical per molecule, $y$ has an average value from 0.5 to 2.5, and $z$ has an average value from .1 to 2.5, and the sum of $y+z$ is no more than 3; and (C) at least a trace of HX' in which X' is chlorine, bromine or iodine, there being at least 5% by weight of (B) based on the weight of (A), whereby cyclosiloxanes of the formula $(R_2SiO)_x$ are formed in which $x$ is an integer greater than 3, and R is as above defined.

2. A method in accordance with claim 1 in which (B) is a dichlorosilane.

3. The process of claim 1 in which (A) is hexamethylcyclotrisiloxane and (B) is a dichlorosilane.

4. The method in accordance with claim 1 in which the cyclosiloxanes produced are predominately of the formula $(R_2SiO)_{3x}$ where $x$ is an integer of at least 2.

5. The method in accordance with claim 4 in which (B) is a dichlorosilane.

6. The method in accordance with claim 4 in which (A) is hexamethylcyclotrisiloxane and (B) is a dichlorosilane.

References Cited

UNITED STATES PATENTS 3,274,154   9/1966   Kendrick et al. _ 260—448.2 XR

TOBIAS E. LEVOW, Primary Examiner

P. F. SHAVER, Assistant Examiner

U.S. Cl. X.R.

260—448.8, 46.5; 252—49.6, 78